(12) United States Patent
Inukai

(10) Patent No.: US 6,259,073 B1
(45) Date of Patent: Jul. 10, 2001

(54) TEMPERATURE CONTROL DEVICE FOR CONTROLLING TEMPERATURE OF HEAT ROLLER USED IN IMAGE FORMING DEVICE

(75) Inventor: Katsumi Inukai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/348,283

(22) Filed: Jul. 7, 1999

(30) Foreign Application Priority Data

Jul. 7, 1998 (JP) .................................................. 10-191620

(51) Int. Cl.⁷ ....................................................... H05B 1/02
(52) U.S. Cl. ......................... 219/497; 219/506; 219/216; 219/502; 399/330; 399/335
(58) Field of Search .................................... 219/501, 502, 219/216, 497, 505, 494, 492; 399/330, 335, 328

(56) References Cited

U.S. PATENT DOCUMENTS 3,936,658 * 2/1976 Traister ................................. 219/216
4,435,677 * 3/1984 Thomas ................................. 323/235
5,575,942    11/1996 Watanabe .
5,729,814    3/1998 Suzuki et al. .
5,826,152    10/1998 Suzuki et al. .

FOREIGN PATENT DOCUMENTS 8-110723    4/1996 (JP) .

* cited by examiner

Primary Examiner—Mark Paschall
(74) Attorney, Agent, or Firm—Oliff & Berridge, PLC

(57) ABSTRACT

To provide a temperature control wherein a controller provided at a secondary side of a transformer can control a temperature of a heat roller which includes a heat generating sheet. An operational amplifier 161 compares a potential V with a reference potential Vr, and outputs a comparison result. The potential V corresponds to temperature of the heat roller which is detected by a thermistor 171. The reference potential Vr corresponds to a control signal received from a CPU 71 through photo-transistor-couplers PC1 to PCn. The comparison result is input to the CPU 71 through a photo-transistor-coupler 171. The CPU 71 controls ON/OFF of a fixing heater 15a through a photo-TRIAC-coupler 93. Because the photo-transistor-couplers and the photo-TRIAC-coupler can transmit signals without relying on electrical conductivity, the above temperature control can be performed while the fixing heater 15a, a TRIAC 95, and the thermistor are provided at a primary side of a transformer 121, and the CPU 71 at a secondary side.

21 Claims, 7 Drawing Sheets

TEMPERATURE CONTROL DEVICE FOR CONTROLLING TEMPERATURE OF HEAT ROLLER USED IN IMAGE FORMING DEVICE

BACKGROUND OF THE INVENTION 1. field of the Invention

The present invention relates to a temperature control device for controlling temperature of a heat roller used in an image forming device, and more specifically to a temperature control device which controls temperature of a heat roller by controlling ON/OFF of a heat generating sheet of the heat roller, wherein the heat generating sheet is attached on an inner surface or an outer surface of a cylindrical roller body.

2. Description of the Related Art

An image forming device, such as an ink jet printer and a laser printer, includes a heat roller for thermally fixing toner images or ink images onto a recording medium, such as a recording sheet or a film. A conventional heat roller includes a roller body and a halogen lamp. The halogen lamp is disposed inside of the roller body, separated from the inner surface of the roller body by an air space. The halogen lamp generates heat when supplied with an electric current. The heat radiates across the air space to the roller body, so that the temperature of the heat roller increases. A thermistor is disposed on the outer surface of the roller body. A CPU controls the halogen lamp, and consequently the temperature of the roller body, based on temperature detected by the thermistor. The air space between the heat roller and the halogen lamp provides excellent electrical insulation, so the thermistor is provided on the low voltage side of a transformer, that is, on the same side as the CPU. Therefore, the thermistor and the CPU are directly connected by an electrically conductive line. However, because the halogen lamp is usually provided near a rotational axis of the heat roller, its heat conductivity is inefficient, so surface temperature of the heat roller takes long time to reach a predetermined temperature from when supply of electric current is started.

Japanese Patent-Application Publication (Kokai) Nos. HEI-8-110723 and HEI-8-194401 disclose a heat roller with increased heat conductive efficiency so that the surface temperature of the heat roller can be quickly increased. The heat roller includes cylindrical roller body and a heat generating sheet. The heat generating sheet is formed from an insulation sheet provided with a resistor pattern, and is attached along the inner surface of the cylindrical roller body. The insulation sheet electrically insulates the resistor pattern from the roller body. Because the resistor pattern is disposed next to the inner surface of the roller body, heat generated by the resistor pattern is efficiently conducted and quickly increases the temperature of the heat roller. It should be noted that the heat-generating-sheet can be attached along an outer surface of the cylindrical roller body. In this case also, the heat conductivity, and consequently the speed at which temperature of the heat roller increase, can be improved.

It is conceivable to control for a CPU to control the surface temperature of the heat roller, to maintain the surface temperature to a predetermined temperature, based on surface temperature detected by, for example, a thermistor. However, in the above configuration, because no insulation air space is provided between the roller body and the heat generating sheet, the roller body is not reliably electrically insulated from the heat generating sheet. For this reason, the thermistor needs to be provided on the high-voltage side, that is, the primary side, of a transformer, that is, on the same side as the heat generating sheet. Because the CPU is provided at a low-voltage side, that is, the secondary side, of the transformer along with an operation panel and the like, the CPU cannot be connected to the thermistor by an electrically conductive line. Otherwise, there is a danger that a user may get an electric shock. Therefore, it is difficult to use a CPU to detect and control the temperature of a heat roller with a heat generating sheet.

SUMMARY OF THE INVENTION

It is an objective of the present invention to overcome the above problems and also to provide a temperature detecting device capable of reliably controlling a temperature of a heat roller that includes a heat generating sheet, using a controller provided on a secondary side of a transformer.

In order to achieve the above and other objectives, there is provided a temperature control device for controlling a temperature of a heat roller which includes a roller body in the form of a cylindrical shape having a peripheral surface, and a heat generating sheet wound around the peripheral surface of the roller body. The heat generating sheet generates heat when supplied with an electric current from a power source through a circuit. The temperature control device includes a sensor, a switch, a controller, a first transmitting unit, and a second transmitting unit. The sensor detects a temperature of the heat roller, and outputs a detection signal indicating the temperature. The switch switches ON/OFF of the circuit. When the circuit is ON, the heat generating sheet is supplied with the electric current from the power source and generates heat. The controller outputs a control signal to the switch based on the detection signal. The switch performs ON/OFF actions of the circuit in response to the control signal to thereby control generation of heat in the heat generating sheet. The first transmitting unit transmits the detection signal from the sensor to the controller using a non-electrically conductive line. The second transmitting unit transmits the control signal from the controller to the switch using a non-electrically conductive line.

There is also provided an image forming device including a recording station, a power source, a heat roller, a circuit, a sensor, a switch, a controller, a first transmitting unit, and a second transmitting unit. The recording station forms an image on a recording medium. The heat roller thermally fixes the image formed on the recording medium. The heat roller includes a roller body in the form of a cylindrical shape having a peripheral surface, and a heat generating sheet wound around the peripheral surface of the roller body. The circuit connects the power source and the heat roller. The sensor detects a temperature of the heat roller and outputs a detection signal indicating the temperature. The switch switches ON/OFF of the circuit. When the circuit is ON, the heat generating sheet is supplied with an electric current from the power source and generates heat. The controller outputs a control signal to the switch based on the detection signal. The switch performs ON/OFF actions of the circuit in response to the control signal to thereby control generation of heat in the heat generating sheet. The first transmitting unit transmits the detection signal from the sensor to the controller using a non-electrically conductive line. The second transmitting unit transmits the control signal from the controller to the switch using a non-electrically conductive line.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENT

A laser printer including a temperature control device according to a preferred embodiment of the present invention will be described while referring to the accompanying drawings. In the following description, the expressions "fraont", "rear", "left", "right", "upper", "lower", "above", are used throughout the description to define the various parts when the laser printer is disposed in an orientation in which it is intended to be used.

Figure 1:
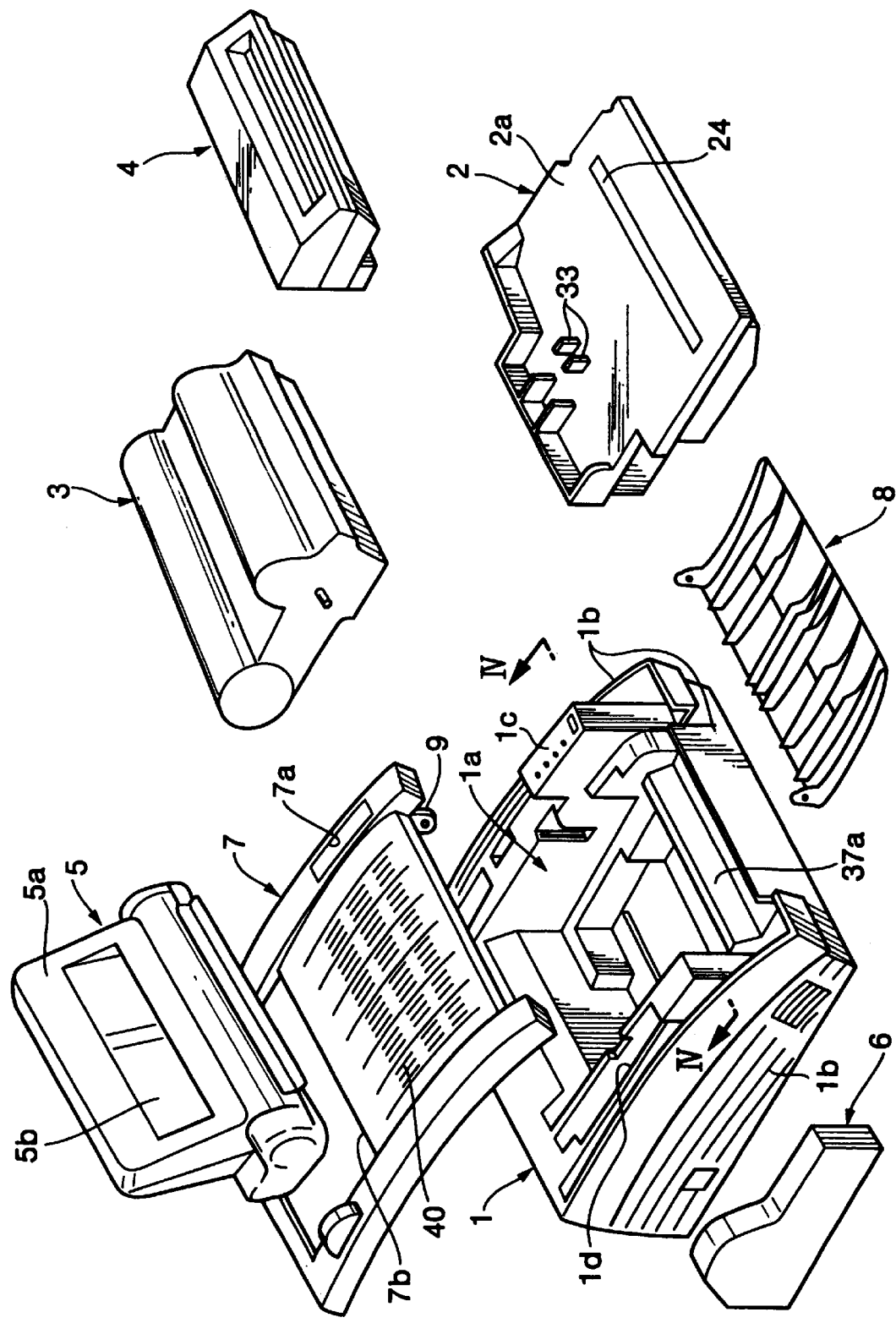
FIG. 1 is an exploded perspective view showing a laser printer including a fixing unit according to an embodiment of the present invention.

As shown in FIG. 1, a laser printer 100 includes a case 1, a scanner unit 2, a process unit 3, a fixing unit 4, a sheet supply unit 5, a drive system unit 6, a top cover 7, and a discharge tray 8.

The case 1 is formed from a synthetic resin by injection molding techniques. The case 1 includes a main frame 1a and a main cover 1b integrally formed with the main frame 1a. The main frame 1 has a rectangular shape when viewed from above and has a front side portion, a rear side portion, a left side portion, a right side portion, and a bottom portion. The main cover 1b covers these side portions of the main frame 1a. The right side portion of the main frame 1a is formed with an upwardly protruding control panel portion 1c. A user can select various control modes for the laser printer 100 by operating the control panel portion 1c. The main cover 1b and the left side portion of the main frame 1a define a receiving slot 1d.

The top cover 7 is formed from a synthetic resin and provided for covering the case 1. The top cover 7 is formed with an opening 7a for receiving the operation panel portion 1c and an opening 7b for receiving the sheep supply unit 5. Protruding brackets 9 are formed on left and right sides at the front portion of the top cover 7. The brackets 9 are for pivotably supporting the discharge tray 8 so that the discharge tray 8 can be reclined against the top cover 7 when not in use.

Figure 3:
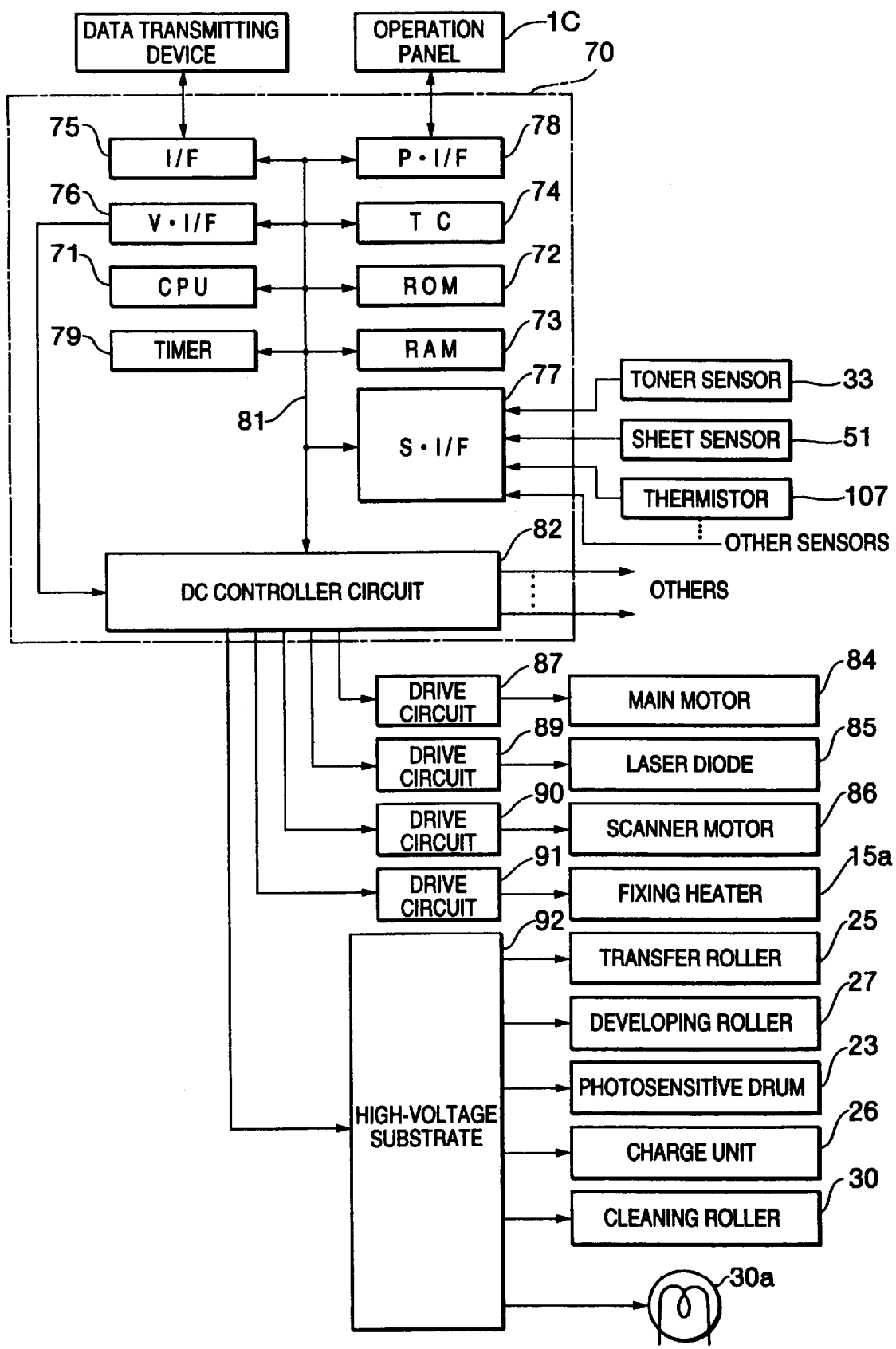
FIG. 3 is a block diagram showing a control unit and other electrical components of the laser printer of FIG. 1.

The drive system unit 6 includes a gear train (not shown) and a main motor 84 shown in FIG. 3. The drive system unit 6 is inserted into the receiving slot 1d from the underside of the main case 1 and is fixedly mounted therein.

Figure 2:
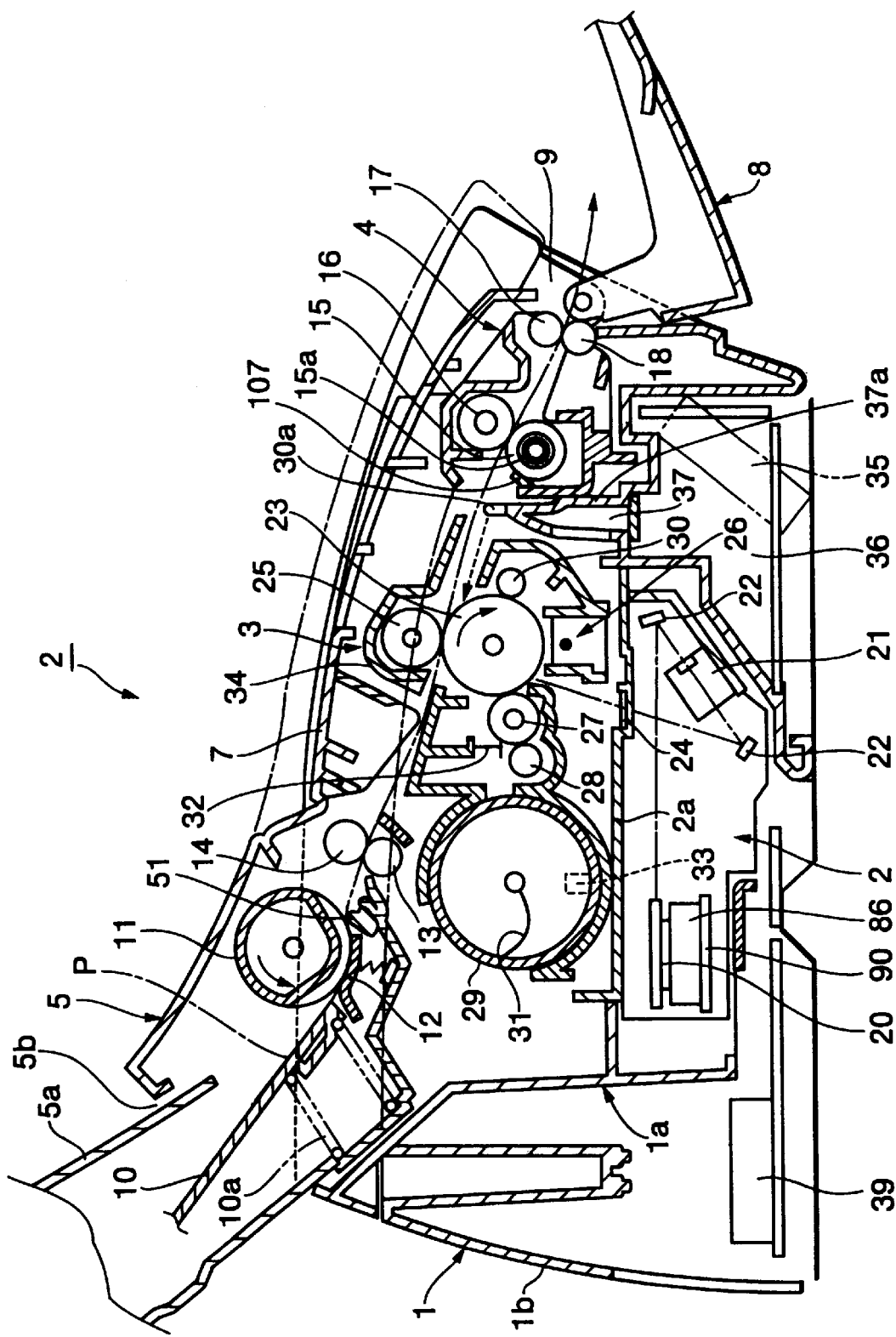
FIG. 2 is a cross-sectional view showing the laser printer of FIG. 1.

As shown in FIGS. 1 and 2, the sheet supply unit 5 is positioned at the upper rear end portion of the case 1. The process unit 3 is detachably mounted in the main frame 1a downstream from the sheet supply unit 5 in a sheet feed direction indicated by an arrow F. The scanner unit 2 is provided beneath the process unit 3. The fixing unit 4 is provided further downstream from the process unit 3 in the sheet feed direction F.

The sheet supply unit 5 is provided for supplying a recording sheet S to the process unit 3. As shown in FIGS. 1 and 2, the sheet supply unit 5 includes a feeder case 5a, a support plate 10, a spring 10a, a sheet supply roller 11, a separation pad 12, and a pair of register rollers 13, 14. A plurality of recording sheets S are supported in a stacked fashion on the support plate 10 within the feeder case 5a. The sheet supply roller 11 is provided adjacent to a lower end portion of the support plate 10. The driving system unit 6 is connected to the sheet supply roller 11 to drive rotation of the sheet supply roller 11. The separation pad 12 is disposed beneath the feed roller 11. The pair of the register roller 13, 14 are rotatably positioned at the downstream side of the sheet supply roller 11 in the sheet feed direction F. The sheet supply unit 5 is further formed with an upwardly-slanting-manually-feed-opening-5b through which a user can manually insert desired recording sheets.

The spring 10a urges the recording sheets S on the support plate 10 toward the sheet feed roller 11 so that leading edge of the uppermost recording sheet S is pressed against the sheet feed roller 11. When the sheet supply roller 11 is driven to rotate, the recording sheets S are fed one at a time in the sheet feed direction F and supplied to the register rollers 13, 14. Rotation of the resister rollers 13, 14 further transports the recording sheet S toward the process unit 3.

The scanner unit 2 is for reading an original image from an original document (not shown) and radiating laser beam corresponding to the original image. The scanner unit 2 includes a support plate 2a, a laser light unit (not shown), a polygon mirror 20, a lens 21, reflectors 22a, 22b, a glass plate 24, and a scanner motor 86 (FIG. 3). The support plate 2a is formed from a synthetic resin and is fixedly mounted by screws (not shown) onto a stay portion (not shown), which is integrally formed with the bottom portion of the main frame 1a. Although not shown in the drawings, the support plate 2a is formed with an elongated scanner slit extending in a direction perpendicular to the sheet surface of FIG. 2. The glass plate 24 is provided for covering the scanner slit. The laser light unit includes a laser diode 85 (FIG. 3) for radiating the laser beam. The laser beam radiated from the laser light unit passes through the scanner split and the glass plate 24 and exposes a photosensitive peripheral surface of a photosensitive drum 23 to be described later.

The process unit 3 is provided for forming a toner image on a surface of the recording sheet S supplied from the resistor rollers 13, 14. As shown in FIG. 2, the process unit 3 includes the photosensitive drum 23, a transfer roller 25, a scorotoron charge unit 26, a developing roller 27, a feed roller 28, a detachable toner cartridge 29, a cleaning roller 30, a discharging lamp 30a, a blade 32, and a case 34. The case 34 is made from a compound resin and stores the other components. The photosensitive drum 23 extends in a direction parallel with the scanner port, that is, perpendicular to the sheet surface of FIG. 2, and is formed with a photosensitive peripheral layer at its surface. The charge unit 26 is disposed beneath the photosensitive drum 23 for developing a uniform charge on the photosensitive peripheral surface of the photosensitive drum 23. The transfer roller 25 is disposed above the photosensitive drum 23 in contact therewith. Recording sheets S supplied from the sheet supply unit 5 are transported between the photosensitive drum 23 and the transfer roller 25. The transfer roller 25 is applied with a bias opposite the bias of the photosensitive drum 23 so that an electrical field develops therebetween.

The developing roller 27 and the feed roller 28 together serve as a developing unit and are disposed upstream from the photosensitive drum 23 in the sheet feed direction F. The toner cartridge 29 is provided further upstream from the developing roller 27 and the feed roller 28 in the sheet feed direction F. The cleaning roller 30 and the discharging lamp 30a are disposed downstream from the photosensitive drum 23.

The toner cartridge 29 stores toner particles therein (not shown) and includes an agitator 31 for agitating the toner particles and supplying the toner particles to the feed roller 28. Rotation of the feed roller 28 further supplies the toner particles onto the developing roller 27 to form a toner layer on the developing roller 27. Then, the blade 32 regulates the thickness of the toner layer on the developing roller 27 to form a uniform thickness. Rotation of the developing roller 27 transports the toner layer toward the photosensitive drum 23.

The surface of the photosensitive drum 23, which was uniformly charged by the charge unit 26, is irradiated by the laser beam from the laser light unit to form thereon an electrostatic latent image corresponding to the original image. Then, toner particles are supplied to the photosensitive drum 23 from the developing roller 27, thereby developing the electrostatic latent image into a toner image. Rotation of the photosensitive drum 23 transport the toner image toward the transfer roller 25. The toner image is attracted by and travels toward the transfer roller 25 due to the electric field generated between the photosensitive drum 23 and the transfer roller 25, and so impinges into the recording sheet S disposed between the transfer roller 25 and photosensitive drum 23.

Toner particles not transferred onto the recording sheet S are further transported by rotation of the photosensitive drum 23 to be collected by the cleaning roller 30. Afterward, the collected toner particles on the cleaning roller 30 are returned to the photosensitive drum 23 at a predetermined timing and collected by the developing roller 27.

The fixing unit 4 is provided for fixing the toner image onto the recording sheet S. The fixing unit 4 includes a heat roller 15, a pressing roller 16, and a pair of discharge rollers 17, 18. The heat roller 15 includes a fixing heater 15a for generating heat and an aluminum tube 15b for housing the fixing heater 15a. A heat generating sheet is used as the fixing heater 15a in the present embodiments. The aluminum tube 15b has a peripheral surface coated with fluorine. The pressing roller 16 is a rubber roller having a peripheral surface covered with fluorocarbon resin. The pressing roller 16 is urged against the fixing roller 15. When the recording sheet S with the toner image reaches the fixing unit 4, rotation of the pressing roller 16 and the fixing roller 15 draws the recording sheet S between the pressing roller 16 and the fixing roller 15 while the recording sheet S is interposed at the nip portion. Heat generating by the heat roller 15 is applied to the recording sheet S to fix the toner image onto the recording sheet S. The recording sheet S is then picked up by the discharge rollers 17, 18 and discharged out of the case 1 onto the discharge tray 8.

As shown in FIG. 2, an accommodating portion 36 is defined below the front side portion of the main frame 1a attached to the main cover 1b for accommodating a cooling fan 35. A plate 37a is disposed between the process unit 3 and the fixing unit 4, and defines as air duct 37. The air duct 37 is connected with the accommodating portion 36 and extends in a direction orthogonal to the sheet feed direction F. The plate 37a includes a front side wall and a rear side wall for preventing heat generated by the heat roller 15 from directly conducting to the process unit 3. The plate 37a has an inverted-V-shaped cross-sectional area when viewed from the side. The rear side wall of the plate 37a is formed with a plurality of slits (not shown). Also, as shown in FIG. 1, the top cover 7 is formed with a plurality of vents 40.

The cooling fan 35 is provided for generating a cooling air current. The cooling air current flows through the air duct 37 and through the slits in the rear side wall of the plate 37a along the main frame 1a until it reaches to and cools off a power section 39, which is provided in the back portion of the case 1, and the main motor 84 of the drive system unit 6. The cooling air current generated by the cooling fan 35 also flows through the slits of the plate 37a, through a space defined between the process unit 3 and fixing unit 4, and through the vents 40, and is expelled out of the case 1.

It should be noted that the sheet supply roller 11, the register rollers 13, 14, and the photosensitive drum 23 form a sheet supply transporting mechanism of the laser printer 100, and that the heat roller 15, the pressing roller 16, the discharge roller 17, and the pinch roller 18 form a sheet discharge transporting mechanism. Both the sheet supply transporting mechanism and the sheet discharge transporting mechanism are driven by the main motor 84.

The laser printer 100 further includes a control unit 70. Although not shown in the drawings, the control unit 70 is disposed in the right side portion with the main frame 1a. As shown in FIG. 3, the control unit 70 includes a central processing unit (CPU) 71. The control unit 70 also includes a read only memory (ROM) 72, a random access memory (RAM) 73, a timing circuit (TC) 74, an interface (I/F) 75, a video interface (V.I/F) 76, a sensor interface (S.I/F) 77, a toner sensor 33, a sheet sensor 51, a thermistor 107, a plurality of other sensors, a panel interface (P.I/F) 78, a timer 79, and a DC controller circuit 82, each connected to the CPU 71 via a bus 81.

The ROM 72 stores various control programs. The RAM 73 includes various temporary memories, such as a reception buffer for storing data received from an external computer, such as a personal computer and a host computer. The timing circuit 74 generates timing signals indicating time to read data from and/or to store data into the reception buffer. The interface 75 receives data from the external data transmitting device. The video interface 76 includes a scanner buffer (not shown) and outputs bit print data in a sequence to the DC controller circuit 82. The sensor interface 77 is connected to the toner sensor 33, the sheet sensor 51, the thermistor 107, and the other sensors so as to receive detection signals from these sensors. The panel interface 78 receives signals from the control panel 1c.

The toner sensor 33 detects remaining amount of toner particles within the toner cartridge 29. As shown in FIG. 2, the toner sensor 33 is positioned so as to protrude upward from the support plate 2a. Although not shown in the drawings, the toner sensor 33 includes a light emission unit and a light reception unit facing each other. The toner cartridge 29 is formed with grooves at its lower surface for receiving the light emission unit and the light reception unit of the toner sensor 33.

The sheet sensor 51 is provided on the downstream side of the feed roller 11 for detecting paper sheets S stored in the sheet supply unit 5. The thermistor 107 for detecting temperature of the heat roller 15 is attached to an outer surface of the heat roller 15, substantially at the lengthwise center of the heat roller 15. It should be noted that although the temperature at the outer surface of the heat roller 15 is detected, this temperature is considered as the temperature of the fixing heater 15a in the present embodiments.

The DC controller circuit 82 is connected to drive circuits 87, 89, 91, 91, and a high-voltage substrate 92. The drive circuits 87, 89, 91, 91 are further connected to the main motor 84, the laser diode 85, a scanner motor 86 for driving the polygon mirror 20, and the fixing heater 15a, respectively. The substrate 92 generates a high-voltage electric field of the photosensitive drum 23, the transfer roller 25, the charge unit 26, the developing roller 27, and the cleaning roller 30, and also illuminates the discharging lamp 30a.

The ROM 72 stores various control programs and memory management programs. The memory management programs are for managing memory sizes and starting addresses of various memories, such as a font memory storing dot pattern print data of characters including letters and symbols, and a reception data buffer and a print image memory provided in the RAM 73.

Figure 4:
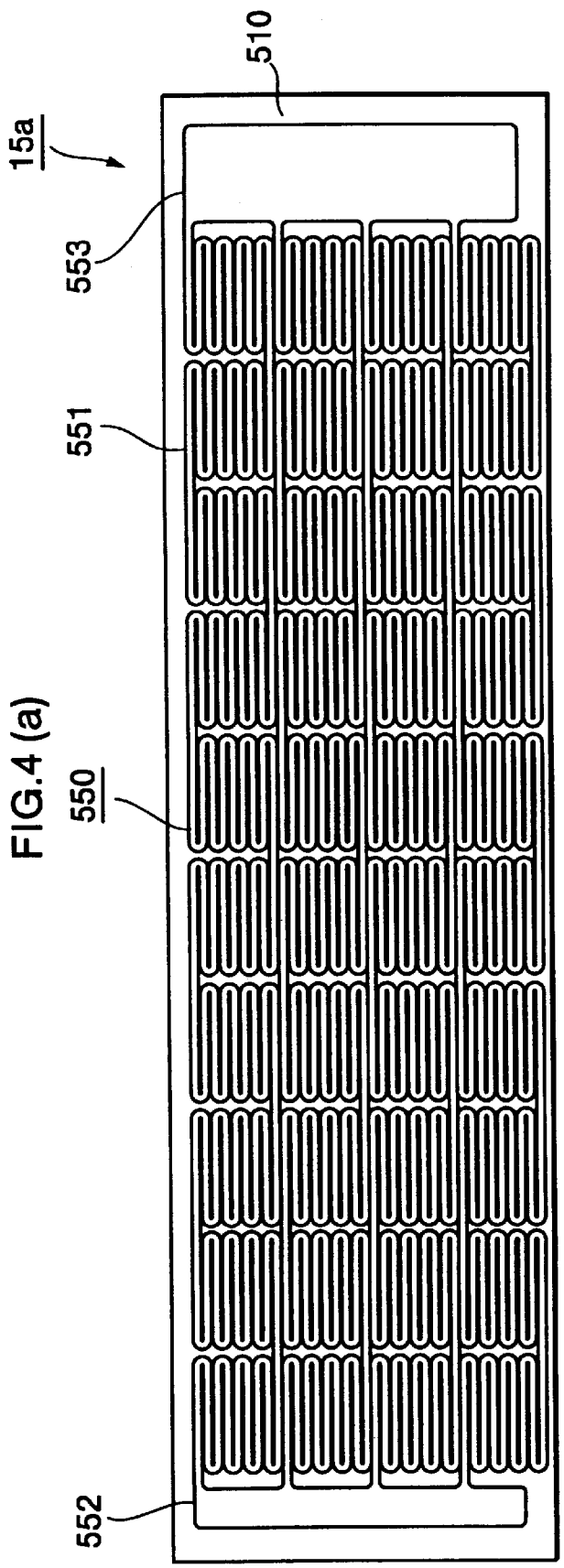
FIG. 4(a) is a plan view showing a heat generating sheet of a heat roller of the laser printer.
FIG. 4(b) is a cross-sectional view of the heat roller.
Figure 4:
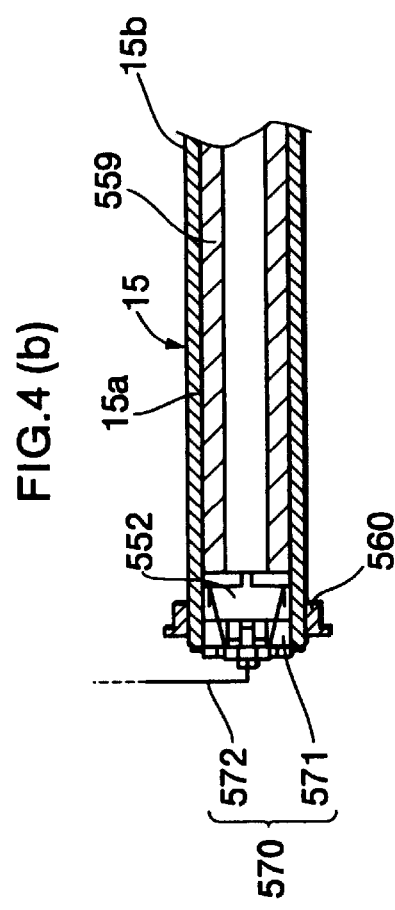

Next, a detailed description of the heat roller 15 will be provided while referring to FIGS. 4(a) and 4(b). As shown in FIG. 4(b), the heat roller 15 includes a fixing heater 15a and a roller body 15b. The roller body 15b is an aluminum pipe coated with a fluorine coat layer on its surface. The fixing heater 15a is fixed to the inner surface of the roller body 15b. The thermistor 107 is attached to the outer surface of the roller body 15b at substantially its longitudinal center.

As shown in FIG. 4(a), the fixing heater 15a includes an insulation sheet 510 and a resistor 550. The insulation sheet 510 is a flexible polyimide resin film. The resistor 550 is made of a stainless steel foil, and attached on one surface of the insulation sheet 510. The resistor 550 includes a heating pattern portion 551 and connecting portions 552, 553. Each of the connecting portions 552, 553 is connected to a corresponding end of the heating pattern portion 551. When an electric current is supplied between the connecting portions 552, 553, the heating pattern portion 551 generates heat.

Each end of the heat roller 15 is freely rotatably supported by a frame of the fixing unit 4 via an electrically conductive support 560.

A contact mechanism 570 is provided to each end of the heat roller 15. The contact mechanism 570 includes a rotary electrode 571 and a stationary electrode 572. The rotary electrode 571 is fixed to the end of the heat roller 15, so that the rotary electrode 571 rotates together with the heat roller 15. The rotary electrode 571 contacts a corresponding one of the connecting portions 552, 553. On the other hand, the stationary electrode 572 is fixed to the frame of the fixing unit 4, and contacts the rotary electrode 571. Therefore, an electric current is supplied to the resistor 550 through the stationary electrode 572 and the rotary electrode 571, thereby increasing the temperature of the heat roller 15.

The fixing heater 15a is attached to the heat roller 15 in the following manner. That is, as shown in FIG. 4(b), the fixing heater 15a is inserted within the heat roller 15 following the inner surface of the heat roller 15a so that the resistor 550 on the insulation sheet 510 faces inward. Next, a heat-resisting sponge 559 is inserted inside of the fixing heater 15a. Then, the fixing heater 15a is driven to generate heat, so that the fixing heater 15a fixedly adheres to the inner surface of the heat roller 15.

Next, a detailed description of the driving circuit 91 and surrounding components, that is, the fixing heater 15a, the thermistor 107, a detection circuit 150, a DC power circuit 110, and the CPU 71, will be described while referring to FIG. 5. The CPU controls ON/OFF of the fixing heater 15a through the driving circuit 91. The thermistor 107 detects surface temperature of the heat roller 15. The detected surface temperature is input into the CPU 71 through the detection circuit 150. The DC power circuit 110 provides DC current to other components. It should be noted that in FIG. 5, a dotted line L indicates a border line between a primary side and a SLEV side of a transformer 121.

Figure 5:
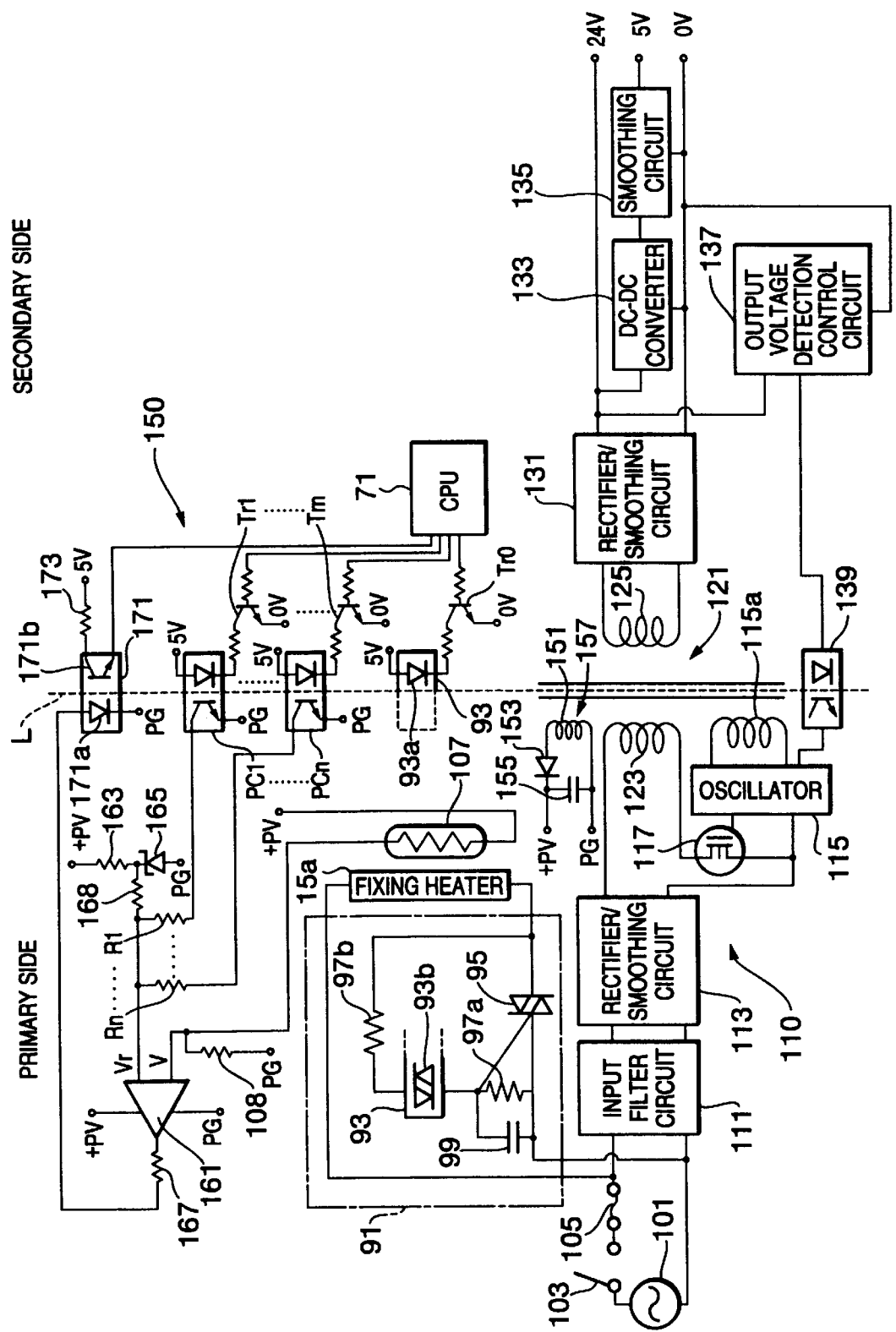
FIG. 5 is a circuit diagram showing electric configuration for controlling temperature of the heat roller according to the embodiment of the present invention.

As shown in FIG. 5, the driving circuit 91 includes a photo-TRIAC-coupler 93, a TRIAC 95, resisters 97a, 97b, and a capacitor 99. The photo-TRIAC-coupler 93 includes a diode 93a and a TRIAC 93b. Each terminal of the TRIAC 93b is connected to a corresponding terminal of the TRIAC 95 by the resistor 97a and the resister 97b, respectively. A gate of the TRIAC 95 is connected between the resistor 97a and the TRIAC 93b, and also to the capacitor 99 in parallel with the resistor 97a. With this configuration, when the TRIAC 93b is turned ON, an electric current is supplied to the resistor 97a.

A serial circuit of an AC 100 V power source 101, a switch 103, a fuse 105, and the fixing heater 15a is connected between the terminals of the TRIAC 95. The fuse 105 blows when supplied with an electric current greater than a predetermined amount. One terminal of the thermistor 107 is connected to the ground potential PG by a resistor 108. The other terminal of the thermistor 107 is connected to the positive potential +PV. An electrical potential V between the thermistor 107 and the resistor 108 is detected by the detection circuit 150, and is output to the CPU 71. Details will be described later.

The CPU 71 is connected to the diode 93a of the photo-TRIAC-coupler 93 by a transistor Tr0. The CPU 71 controls ON/OFF of the diode 93a based on the detection signal from the detection circuit 150, thereby controlling ON/OFF of the fixing heater 15a.

Specifically, while the switch 103 is ON, when the diode 93a is turned ON by the CPU 71, the TRIAC 93b is turned ON. As a result, an electric current is supplied to a parallel circuit of the resistor 97a and the capacitor 99, thereby tuning ON the TRIAC 95. That is, the ON/OFF toggling of the photo-TRIAC-coupler 93 conforms to the ON/OFF toggling of the TRIAC 95. In other words, application of the electric current to the fixing heater 15a is controlled by controlling ON/OFF condition of the TRIAC 95. Because the TRIAC 95 is turned OFF at a zero-cross point, the TRIAC 95 is turned OFF with a delay of at most a half a period of the alternating current with respect of a timing at which the TRIAC 93b is turned OFF. If the photo-TRIAC-coupler 93 is provided with a zero cross point detecting function, the TRIAC 95 is turned ON with a delay of at most a half a period of the power source frequency after the TRIAC 93b is turned ON.

The DC power circuit 110 includes an input filter circuit 111, a rectifier/smoothing circuit 113, an oscillator 115, a main switching element 117, a rectifier/smoothing circuit 131, a DC-DC converter 133, a smoothing circuit 135, an output voltage detection control circuit 137, a photo-transistor-coupler 139, and a resistor 125. The DC power circuit 110 is connected between a serial circuit of the power source 101, the switch 103, and the fuse 105. The power source 101 outputs an AC current, and the AC current is input to the DC power circuit 110 through the switch 103 and the fuse 105. The AC current is, then, rectified by the input filter circuit 111 and the rectifier/smoothing circuit 113. As a result, the rectifier/smoothing circuit 113 outputs a DC voltage to a serial circuit of the main switching element 117 and the coil 123. The coil 123 is provided at the primary side of the transformer 121. The oscillator 115 is connected to the main switching element 117, and has a coil 115a provided at the primary side. The oscillator 115 is a self-excited type oscillator, and turns ON/OFF the main switching element 117 at a predetermined cycle, thereby controlling application of an electric current to the coil 123.

When the coil 123 is supplied with an electric current, a voltage is generated in the coil 125 which is at the secondary side of the transformer 121. The voltage is rectified by the rectifier/smoothing circuit 131 into a 24 V DC voltage, and is supplied to the main motor 84 (FIG. 3). The 24 V DC voltage is also converted into a 5 V DC voltage by the DC-DC converter 133 and the smoothing circuit 135, and supplied to the control unit 70.

The output from the rectifier/smoothing circuit 131 is also input into the output voltage detection control circuit 137. Based on the output from the rectifier/smoothing circuit 131, the output voltage detection control circuit 137 outputs a control signal to the oscillator 115 through the photo-transistor-coupler 139 so as to control ON/OFF of the main switching element 117. In this way, the output voltage detection control circuit 137 controls the rectifier/smoothing circuit 131 to output the 24 V DC current in a stabilized manner.

As described above, the fixing heater 15a and the thermistor 107 are positioned side by side with the roller body 15b interposed therebetween. Therefore, the thermistor 107 is provided at the primary side in the manner of the fixing heater 15a. On the other hand, it is preferable that the CPU 71 be provided at the secondary side. Therefore, in the present embodiment, the detection circuit 150 is designed to have the following configuration for detecting the surface temperature of the heat roller 15.

That is, as shown in FIG. 5, the detection circuit 150 includes a DC power circuit 157 as its own power source. The DC power circuit 157 includes a coil 151, a diode 153, and a capacitor 155. The smoothing circuit 135 is in serial connection with the coil 151. The capacitor 155 is in parallel connection with a serial circuit of the coil 151 and the diode 153. The DC power circuit 157 provides the positive potential +PV and the ground potential PG. The positive potential +PV and the ground potential PG are provided to an operational amplifier 161 (described later) as well.

The detection circuit 150 further includes the operational amplifier 161 and a photo-transistor-coupler 171. An output terminal of the operational amplifier 161 is connected to a diode 171a of the photo-transistor-coupler 171 by a resistor 167. A non-inverted terminal of the operational amplifier 161 is connected to the positive potential +PV by resisters 168, 163. An inverted terminal of the operational amplifier 161 is connected between the thermistor 107 and the resistor 108 so as to detect the potential V between the thermistor 107 and the resistor 108. The non-inverted terminal of the operational amplifier 161 is also connected to the ground potential PG by a resister 168 and a Zener diode 165. Each of a plurality of serial circuits of resisters R1 to Rn and transistors of corresponding photo-TRIAC-couplers PC1 to PCn connects the non-inverted terminal of the operational amplifier 161 to the ground potential PG. The CPU 71 outputs control signals to turn ON the selective photo-TRIAC-couplers PC1 TO PCn. As a result, a selected reference voltage Vr is input to the non-inverted terminal of the operational amplifier 161. As long as all resisters R1 to Rn are set to have appropriate resistivity, there are $2^n$ ways to change the reference voltage Vr.

The operational amplifier 161 compares the potential V with the reference potential Vr, and controls ON/OFF of the diode 171a of the photo-transistor-coupler 171 based on the comparison results, thereby controlling ON/OFF of a transistor 171b of the photo-transistor-coupler 171. When the transistor 171b is turned ON, then a 5 V voltage is supplied to the CPU 71 through a resister 173 and the transistor 171b. In this way, the CPU 71 can detect an output of the operational amplifier 161.

In this configuration, the CPU 71 outputs the control signals to the selective photo-TRIACA-couplers PC1 to PCn so that the reference voltage Vr gradually changes, that is, increases or decreases. Then, the CPU 71 detects the change in output of the operational amplifier 161. The CPU 71 calculates the voltage V. Then, the CPU 71 obtains the surface temperatures of the heat roller 15 based on the voltage V, and controls ON/OFF of the TRIAC 95 so that the surface temperature of the heat roller 15 will be at a desired temperature.

As described above, the operational amplifier 161 compares the voltage V with the reference voltage Vr, and outputs the comparison result to the CPU 71 through the photo-transistor-coupler 171. The CPU 71 controls application of electric current to the fixing heater 15a of the heat roller 15 based on the received comparison result. Photo-transistor couplers and photo-TRIAC-couplers are those which are capable of transmitting/receiving communication signals without relying on electrical conductivity. Therefore, transmitting/receiving of above-described signals can be performed while the fixing heater 15a, the TRIAC 95, and the thermistor 107 are provided at the primary side, and the CPU 71 is provided at the secondary side. Therefore, a temperature of the heat roller 15 which includes the heat generating sheet as the fixing heater 15a can be preferably controlled by the CPU 71 at the secondary side. This enables temperature control using software.

Moreover, as described above, signal can be transmitted from the thermistor 107 to the CPU 71 by the detection circuit 150 that has a simple configuration. Also, the reference voltage Vr can be changed to various levels by the photo-transistor-couplers PC1 to PCn. Therefore, the laser printer 100 of the present embodiment can have a reduced size and simplified configuration. Also, the CPU 71 can precisely control the temperature of the heat roller 15 while detecting the temperature in various manners. It should be noted that for controlling the heat roller 15 to have a predetermined fixed temperature, the reference voltage Vr can be set to a constant voltage level, so that the configuration can be further simplified.

Also, as described above, the CPU 71 uses the coil 125 which is provided at the secondary side as its driving power source and is connected to the same power source as the fixing heater 15a. Because the coil 125 is not directly electrically connected to the components at the primary side because of the photo-transistor-coupler 139, the configuration of the laser printer 100 can be simplified. Also, because the coil 125 serving as the driving power source of the CPU 71 is provided at the secondary side, the safety of the laser printer 100 can be secured.

Figure 6:
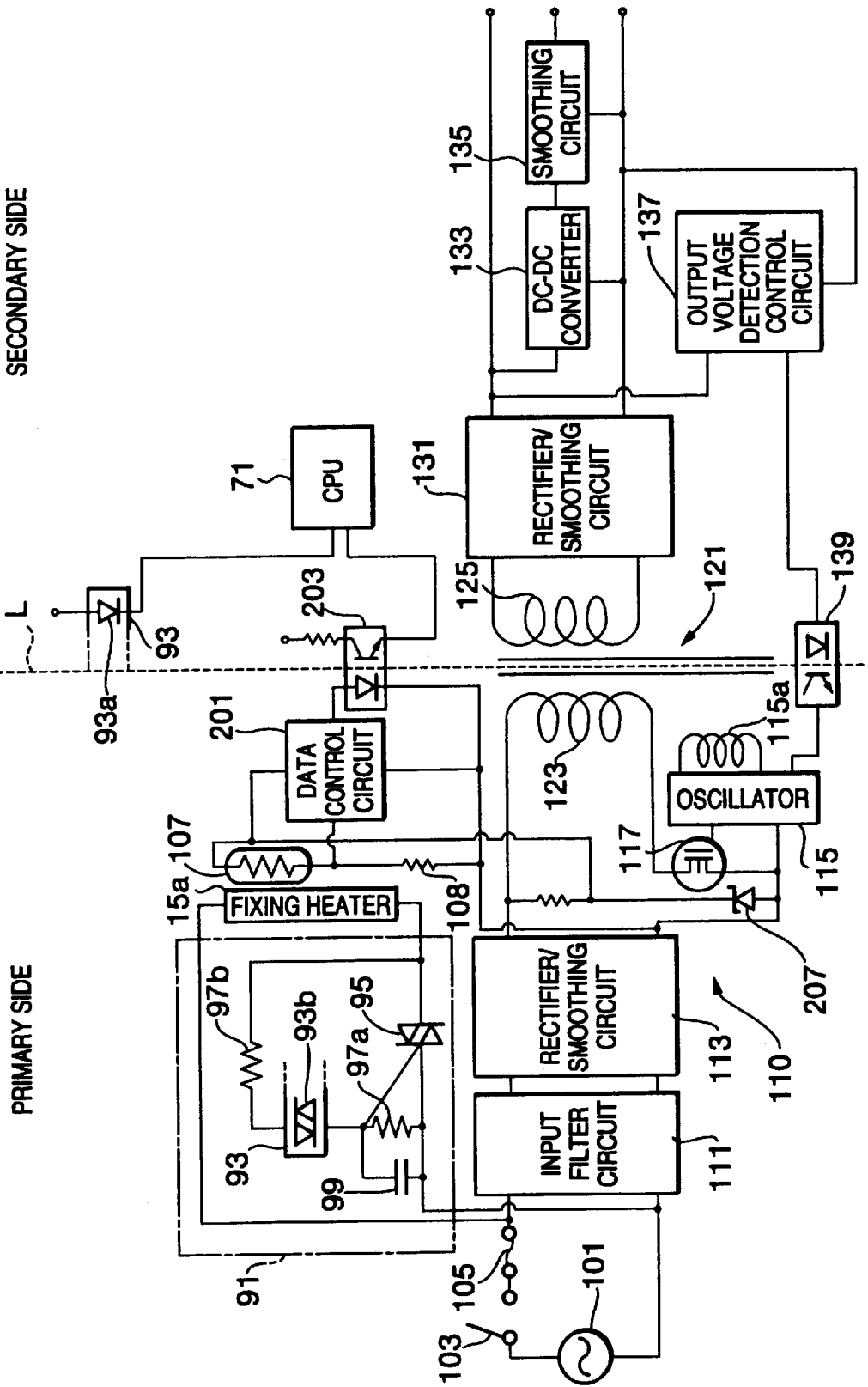
FIG. 6 is a circuit diagram showing electric configuration for controlling temperature of the heat roller according to a first modification of the embodiment of the present invention.

Next, a first modification of the above-described embodiment will be described while referring to FIG. 6. In the present modification, a data control circuit 201 is provided at the primary side. The data control circuit 201 is provided with the DC power circuit 157 as its driving power source.

The DC power circuit 157 includes the coil 151, the diode 153, and the capacitor 155. The DC power circuit 157 applies a voltage to a serial circuit of the thermistor 107 and the resistor 108. The potential V between the thermistor 107 and the resistor 108 is input to the data control circuit 201 so that the data control circuit 201 detects the surface temperature of the heat roller 15. The data control circuit 201 generates digital signal indicating the surface temperature, and then, transmits the digital signal to the CPU 71 through the photo-transistor-coupler 203. The CPU 71 controls ON/OFF of the fixing heater 15a through the photo-TRIAC-coupler 93 based on the received digital signal.

In this modification also, the primary side and the secondary side of the transformer 121 are communicable through the photo-TRIAC-coupler 93, photo-transistor-coupler 203, and the photo-transistor-coupler 139. This configuration provides the same effects as that of the above-described embodiment. Also, because the digital data is transmitted from the data control circuit 201 at the primary side to the CPU 71 at the secondary side to inform the CPU 71 of the surface temperature of the heat roller 15, the CPU 71 can detect the precise surface temperature of the heat roller 15. Therefore, the temperature of the heat roller 15 can be further accurately and reliably controlled.

Figure 7:
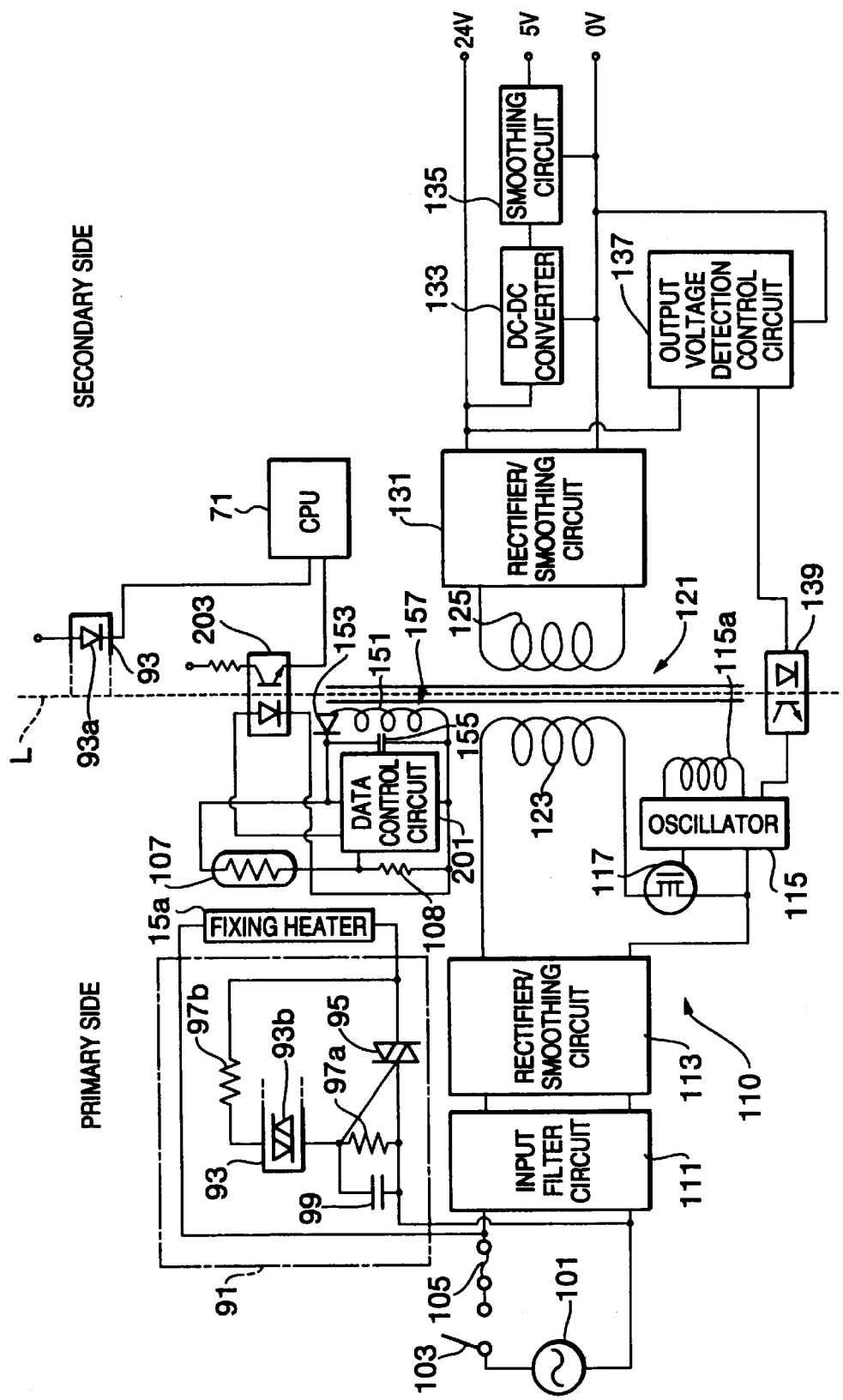
FIG. 7 is a circuit diagram showing electric configuration for controlling temperature of the heat roller according to a second modification of the embodiment of the present invention.

Next, a second modification of the above-described embodiment will be described while referring to FIG. 7. A configuration of the present modification is similar to that of the first modification. However, in the present modification, the output of the rectifier/smoothing circuit 113 is connected to a serial circuit of the resistor 205 and a Zener diode 207. The serial circuit of the resistor 205 and the Zener diode 207 is in parallel connection with a serial circuit of the coil 123 and the main switching element 117. A voltage generated between the terminals of the Zener diode 207 is used as the driving power source of the data control circuit 201, and also is input between the serial circuit of the thermistor 107 and the resistor 108. With this configuration, the laser printer 100 can have a further simplified configuration, thereby further reducing the manufacturing costs. Also, the voltage between the terminals of the Zener diode 207 can be used as a voltage between the positive potential +PV and the ground potential PG of FIG. 5. In this way, the DC power circuit 157 can be dispensed with.

However, when the DC power circuit 157 is used as in the above-described embodiment and the first modification, the detecting circuit 150 and the data control circuit 201 can further reliably secure a current capacity of the driving power source. As a result, the detecting circuit 150 and the data control circuit 201 can have further improved operational ability. Especially, in the first modification, the data control circuit 201 can execute high-level operations including a number of steps, so that temperature control of the heat roller 15 can be further reliably operated.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiment, the photo-transistor-couplers and the photo-TRIAC-couplers are used as means for transmitting signals without using electrically conductive means. However, different types of transmitting means can be used. For example, a transformer can be used. In this case, a voltage level at an output side can correspond to a voltage level at an input side. Also, an analog signal can be transmitted. Therefore, application voltage to the fixing heater 15a can be sequentially changed in continuation, and the surface temperature of the heat roller 15 can be continuously detected. However, when the photo-coupler is used as in the above-described embodiment, the primary side and the secondary side can be reliably insulated from each other by a simple circuit, thereby reducing manufacturing costs.

Also, in the embodiments described above, the surface temperature of the heat roller heater 15a is detected using the thermistor 107. However, the temperatures of the fixing heater 15a itself can be detected by calculating impedance of the fixing heater 15a. Alternatively, the surface temperature of the heat roller heater 15a can be detected using a peltier element or a thermo-coupler. However, when the thermistor 107 is used, a configuration of a circuit for outputting an electric signal corresponding to the surface temperature, that is, the voltage V, can be simplified. Therefore, manufacturing costs can be preferably reduced.

Although the fixing roller 15 of the present invention is used in the laser printer 100 in the above-described embodiments, the fixing roller 15 can be used in different kinds of image forming devices, such as copy machines and ink jet printers.

The present invention can also be applied to a temperature control device for controlling a heat roller wherein a heat generating sheet is attached outer peripheral surface of the cylindrical roller body. The roller body can have either a column shape or a tube shape.

What is claimed is:

1. A temperature control device for controlling a temperature of a heat roller comprising a roller body in the form of a cylindrical shape having a peripheral surface, and a heat generating sheet wound around the peripheral surface of the roller body, the heat generating sheet generating heat when supplied with an electric current from a power source through a circuit, the temperature control device comprising:

a sensor that detects a temperature of the heat roller, and outputs a detection signal indicating the temperature;

a switch that switches ON/OFF of the circuit, wherein when the circuit is ON, the heat generating sheet is supplied with the electric current from the power source and generates heat;

a controller that outputs a control signal to the switch based on the detection signal, wherein the switch performs ON/OFF actions of the circuit in response to the control signal to thereby control generation of heat in the generating sheet;

a first transmitting unit that uses a non-electrical conductive line for transmission;

a second transmitting unit that transmits the control signal from the controller to the switch using a non-electrically conductive line; and a transformer that has a primary side and a secondary side, the transformer having a first coil at the primary side and a second coil at the secondary side, the first coil being connected to the power source, wherein the second coil provides electrical power to the controller.

2. The temperature control device according to claim 1, wherein the non-electrically conductive lines of the first transmitting unit and the second transmitting unit comprises a photo-coupler.

3. The temperature control device according to claim 1, further comprising a digital unit that communicates with the sensor and the first transmitting unit; and a third transmitting unit that transmits a reference signal from the controller to the digital unit using a non-electrically conductive line, the reference signal indicating a reference value;

wherein the digital unit compares the detection signal with the reference signal to obtain a comparison result, and outputs the binary signal indicating the comparison result to the controller through the first transmitting unit.

4. The temperature control device according to claim 3, wherein the third transmitting unit transmits the reference signal using a photo-coupler as the non-electrically conductive line.

5. The temperature control device according to claim 3, wherein the controller outputs a selective one of a plurality of predetermined reference signals to the digital unit through the third transmitting unit.

6. The temperature control device according to claim 1, wherein the controller is provided at the secondary side of the transformer, and the sensor is provided at the primary side of the transformer.

7. The temperature control device according to claim 1, further comprising a process unit that is provided between the sensor and the first transmitting unit and converts the detection signal into a digital signal, the process unit outputting the digital signal to the controller through the first transmitting unit.

8. The temperature control device according to claim 7, wherein the transformer further comprising a third coil at the primary side, the third coil being formed separate from the first coil and the second coil, and wherein the third coil provides electrical power to the process unit.

9. The temperature control device according to claim 1, wherein the sensor is a thermistor attached to a surface of the heat roller.

10. An image forming device comprising:
a recording station that forms an image on a recording medium;
a power source that supplies an electric current;
a heat roller that thermally fixes the image formed on the recording medium, the heat roller comprising a roller body in the form of a cylindrical shape having a peripheral surface, and a heat generating sheet wound around the peripheral surface of the roller body;
a circuit that connects the power source and the heat roller;
a sensor that detects a temperature of the heat roller and outputs a detection signal indicating the temperature;
a switch that switches ON/OFF of the circuit, wherein when the circuit is ON, the heat generating sheet is supplied with the electric current form the power source and generates heat;
a controller that outputs a control signal to the switch based on the detection signal, wherein the switch performs ON/OFF actions of the circuit in response to the control signal to thereby control generation of heat in the heat generating sheet;
a first transmitting unit that uses a non-electrically conductive line for transmission;
a second transmitting unit that transmits the control signal from the controller to the switch using a non-electrically conductive line; and
a digital unit that is connected to the sensor, the digital unit outputting a binary signal to the controller through the first transmitting unit, the binary signal being produced based on the detection signal.

11. The image forming device according to claim 10, wherein the non-electrically conductive lines of the first transmitting unit and the second transmitting unit comprises a photo-coupler.

12. The image forming device according to claim 10, further comprising:
a third transmitting unit that transmits a reference signal from the controller to the digital unit using a non-electrically conductive line, the reference signal indicating a reference value, wherein the digital unit compares the detection signal with the reference signal to obtain a comparison result, and outputs the binary signal indicating the comparison result to the controller through the first transmitting unit.

13. The image forming device according to claim 12, wherein the third transmitting unit transmits the reference signal using a photo-coupler as the non-electrically conductive line.

14. The image forming device according to claim 12, wherein the controller outputs a selective one of a plurality of predetermined reference signals to the digital unit through the third transmitting unit.

15. The image forming device according to claim 10, wherein the controller is provided at the secondary side of the transformer, and the sensor is provided at the primary side of the transformer.

16. The image forming device according to claim 10, further comprising a process unit that is provided between the sensor and the first transmitting unit and converts the detection signal into a digital signal, the process unit outputting the digital signal to the controller through the first transmitting unit.

17. The image forming device according to claim 16, wherein the transformer further comprising a third coil at the primary side, the third coil being formed separate from the first coil and the second coil, and wherein the third coil provides electrical power to the process unit.

18. The image forming device according to claim 10, wherein the sensor comprises a thermistor.

19. A temperature control device for controlling a temperature of a heat roller comprising a roller body in the form of a cylindrical shape having a peripheral surface, and a heat generating sheet wound around the peripheral surface of the roller body, the heat generating sheet generating heat when supplied with an electric current from a power source through a circuit, the temperature control device comprising:
a sensor that detects a temperature of the heat roller, and outputs a detection signal indicating the temperature;
a switch that switches ON/OFF of the circuit, wherein when the circuit is ON, the heat generating sheet is supplied with the electric current from the power source and generates heat;
a controller that outputs a control signal to the switch based on the detection signal, wherein the switch performs ON/OFF actions of the circuit in response to the control signal to thereby control generation of heat in the generating sheet;
a first transmitting unit that uses a non-electrical conductive line for transmission;
a second transmitting unit that transmits the control signal from the controller to the switch using a non-electrically conductive line;
a transformer that has a primary side and a secondary side, the transformer having a first coil at the primary side and a second coil at the secondary side, the first coil being connected to the power source, wherein the second coil provides electrical power to the controller; and a digital unit that is provided at the primary side of the transformer and connected to the sensor, the digital unit outputting a binary signal to the controller through the first transmitting unit, the binary signal being produced based on the detection signal.

20. The temperature control device according to claim 18, further comprising a third transmitting unit that transmits a reference signal from the controller to the primary side of the transformer for producing the detection signal.

21. The temperature control device according to claim 18, wherein the third transmitting unit comprises a photo-coupler.

* * * * *